July 28, 1931.  J. K. WOOD  1,816,164
SUPPORT
Filed Aug. 29, 1930   2 Sheets-Sheet 1

INVENTOR
Joseph Kaye Wood
BY
Newell + Spencer
ATTORNEY

July 28, 1931.  J. K. WOOD  1,816,164
SUPPORT
Filed Aug. 29, 1930  2 Sheets-Sheet 2
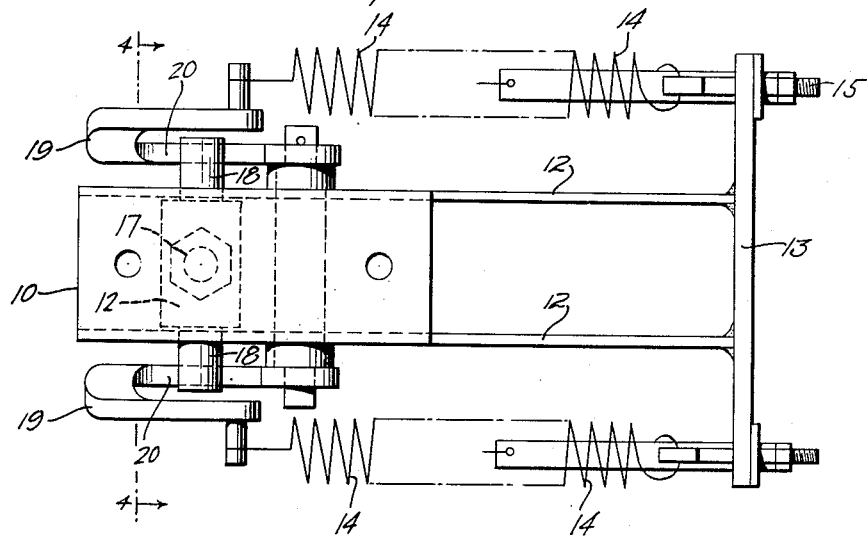
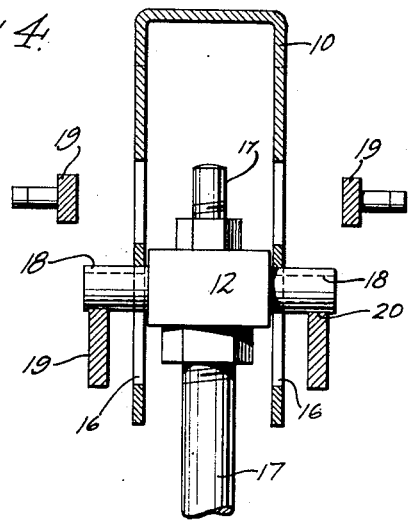
INVENTOR
Joseph Kaye Wood
BY
Newell H. Spencer
ATTORNEY Patented July 28, 1931

1,816,164

UNITED STATES PATENT OFFICE

JOSEPH KAYE WOOD, OF MOUNT VERNON, NEW YORK, ASSIGNOR TO GENERAL SPRING CORPORATION, OF NEW YORK, N. Y., A CORPORATION OF NEW YORK

SUPPORT

Application filed August 29, 1930. Serial No. 478,768.

This invention relates to a support and particularly to a yieldable support which will exert substantially equal force in any position of the load.

There are many situations in which a load must be supported in such manner as to permit its movement either because of relative movement of other parts with which it is connected or because of expansion and contraction under changes of temperature or other causes. In the past it has been the practice to take care of this relative movement where possible by using a balancing weight and pulley or a balance arm. Such arrangement, however, is clumsy and particularly where very heavy loads are supported, is expensive and even, at times, dangerous. Where conditions have permitted a greater variation in the degree to which the load is carried by the support and where it has been impossible to use the balancing method, steel springs have been utilized, their compression or expansion taking care more or less satisfactorily of the required movement. It is well known, however, that the spring support does not afford a uniform support but on the contrary the force which it exerts increases in proportion to the extension or compression from its normal. Thus, where any important amount of movement is involved a very great difference in the degree to which the load is supported occurs and in many cases this lack of uniformity in the degree to which the load is supported is responsible for failures of the supported apparatus. Thus in the case of large steam lines adapted to carry steam at high temperatures the expansion which must be taken care of by the support may be so great that with the usual spring hanger an excessive load is thrown on the pipe connections which may cause failure or leakage and necessitate expensive repairs.

I have now discovered that it is possible to utilize a spring to provide a uniform support at all positions of the supported load and thus to obtain at once the advantages of both the balance type of support and of the spring type of support. I am able to accomplish this advantage by providing between the spring and the load carrying member a connection which compensates for the increases or decreases in the spring tension with extension or contraction. In the form of the invention which I have found most satisfactory this compensating member takes the form of a lever pivoted on a fixed support and so positioned with respect to the load carrying member and the spring that the former acts upon the lever with substantially constant leverage, i. e. along approximately a straight line which remains substantially the same perpendicular distance from the pivot. The spring, on the other hand, acts upon this lever with a changing leverage so that the change in leverage substantially compensates for the change in tension of the spring. Thus the force exerted upon the load carrying member by the spring remains substantially constant although the tension of the spring itself may vary over a wide range.

In the accompanying drawings I have shown a preferred embodiment of my invention.

Figure 3 is a top plan view;

Figure 4 is a sectional view taken on the line 4—4 of Figure 3; and

Figure 1:
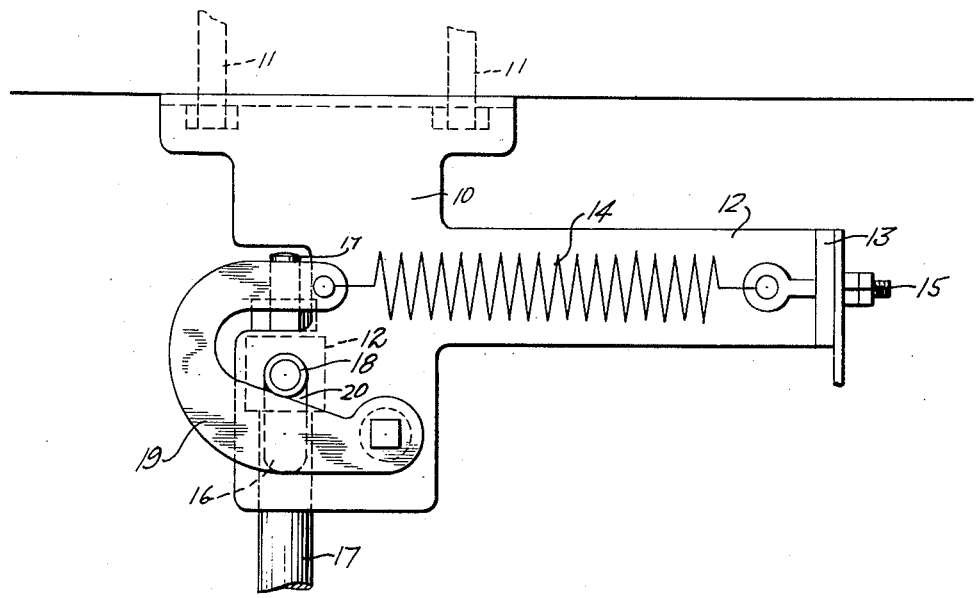
Figure 1 is a side view of a support constructed according to my invention.

Referring to Figures 1 and 3, 10 indicates a fixed support or frame which is secured to a beam or other part of a building or framework as by the bolts 11. The frame 10 as shown is made in channel form and has extensions 12 which at their ends are welded or otherwise secured to or integral with a cross-bar 13 to which the springs 14 are attached by means of the adjusting bolts 15.

Near the bottom of the frame 10 the sides are slotted as shown at 16 and the lower carrying member 17 having anti-friction rollers 18 is mounted within the channel so that its rollers 18 move within the slots 16. The slots 16 thus serve both to guide and to limit the movement of the load carrying member 17. Levers 19 are pivoted on the frame 10 near the level of the slots 16. These levers have bearing surfaces 20 in which the rollers 18 are supported and their free ends engage the ends of the springs 14. The bearing face 20, as shown in Figure 1, is substantially radial of the pivot and positioned so that it moves substantially equally on either side of the perpendicular from the pivot to the load supporting member 17. The end of the lever 19 which is connected to the spring 14 is positioned so that it moves through an arc, the cord of which is at substantially 45° to the line of pull of the spring 14 in its median position.

In the operation of the device described above the load carrying member 17 moves up and down with the load which it carries. As it moves the slot 16 guides the rollers 18 along the line of pull of the load carrying member 17 and the lever 19 is moved or permitted to move about its pivot, the bearing face 20 sliding slightly along the roller 18. As the lever 19 moves from one position to another the end of the spring 14 which is connected thereto is moved at an angle approximately 45° to its line of pull. The result of this is that the line of pull of the spring is moved toward or away from the pivot of the lever 19 a distance substantially equal to the expansion or contraction of the spring 14 and as a result the leverage of the spring upon the lever 19 is altered to substantially the same degree as is the tension of the spring but oppositely so as to compensate for the change in tension.

Figure 5:
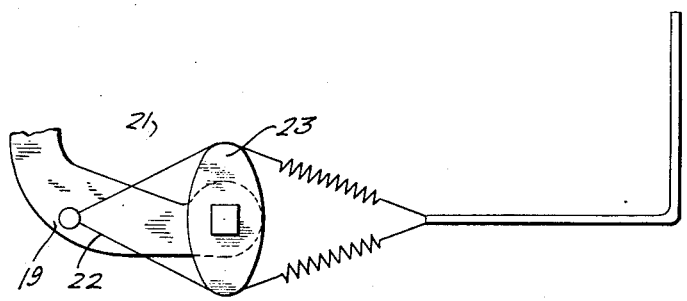
Figure 5 is a diagrammatic view illustrating an additional compensating device.
Figure 2:
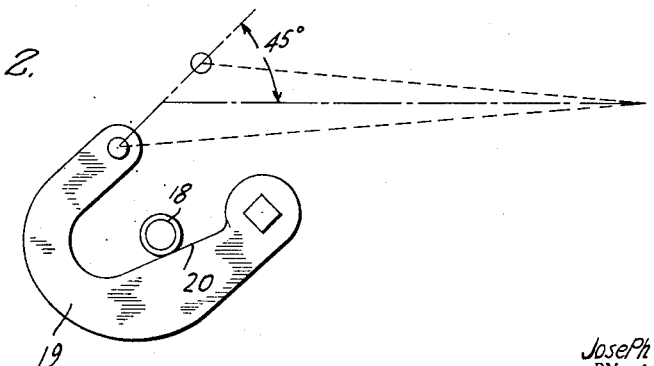
Figure 2 is a diagrammatic view illustrating the operation of the lever to other parts.

Although the embodiment of my invention as described above compensates with a degree of accuracy which is sufficient for most purposes, nevertheless it will be understood that there are approximations in the design so that the compensation is not entirely accurate. For most purposes the simplicity gained is important and the inaccuracies are relatively insignificant, and I therefore prefer the design set forth in the drawings and described above. However, it is possible to compensate for such inaccuracies as for example by means of a device as shown in Figure 5 in which the springs 21 and 22 connected to the lever 19 at one end and to the cross bar 13 at the other, act upon the accurately designed cam 23 connected to the lever 19. In the embodiment illustrated in Figure 5 the cam 23 is made with a central circumferential groove and the springs 21 made of music wire or other wear-resisting spring wire, have straight portions connected with the spiral portions so that the straight portions ride in the groove of the cam 23. The resistance of the springs 21, 22 to separation by the cam 23, plus the pull of the springs on the lever, serves to compensate for the inaccuracies of the device without such compensator. The elliptical form of cam shown in Figure 5 is sufficiently accurate for practical purposes. The exact contour of the cam, however, if mathematically accurate, would vary slightly from the elliptical and will vary slightly according to the general design of the main features of the support.

Although I have shown in the drawings and described above a particular embodiment of my invention it is to be understood that many changes may be made within the scope of my invention. I am aware that many departures from the design which I have shown may be used to compensate for the change in tension of the spring in addition to or instead of the lever construction as shown. Thus the slot 16 might be made to shift the relative position of the rollers 18 one way or the other so as to change the relative leverage and thus to compensate for the change in tension. Or the lever 19 might be pivoted in a slot in the frame 20 and its position governed by means of a cam on the lever 19 or the member 17, or otherwise, so as to change the relative leverage. These expedients being somewhat less simple than that shown are to that extent less desirable except where greater accuracy may be required. Obviously also compression springs may be used instead of expansion springs and the relative length of the levers connected to the load carrying member and to the spring or springs may be varied or reversed. These changes are ememplary, however, of the various ways in which my invention may be embodied.

Having thus described my invention what I desired to secure by Letters Patent and claim, is—

1. A yieldable support comprising a load carrying rod having guide rollers mounted on opposite sides thereof, a fixed support having slots adapted to receive said rollers and guide and limit their motion along a line parallel to the pull of the load, levers pivotally mounted upon opposite sides of the fixed support and having bearing surfaces engaging said rollers to support the load carrying member, said bearing surfaces being near the perpendicular from the pivot to the direction of pull of the load, and springs adjustably connected at one end to the fixed support and connected at the other end to a part of each lever which moves in an arc the cord of which is approximately 45° to the direction of pull of the spring in its median position.

2. A yieldable support comprising a load carrying member having a bearing projection mounted thereon, a fixed support having a slot adapted to receive said projection and to guide and limit its motion, a lever pivoted on said fixed support and having a bearing surface adapted to support said roller, and a spring connected at one end to the fixed support and at the other to a part of the lever so positioned with relation to the enumerated parts that its movement about its pivot will change the effective leverage of the spring so as to compensate for change of force exerted by spring means in different positions.

3. A yieldable support comprising a pivoted member, means for supporting a load upon the pivoted member at a substantially constant distance from the pivot to the direction of the force which the load exerts, spring means connected to said pivoted member and to a fixed support so that any movement of the pivoted member will effect elongation or contraction of the spring means and so that the resulting movement of the spring means will move its line of pull on the pivoted member toward or away from the pivot a distance substantially equal to the elongation or contraction.

4. A yieldable support comprising spring means adapted to be extended or contracted and forming a link in the connection of the supported load to the fixed point of support, and variable connecting means between the load and said spring means adapted to modify the action of the spring means on the load as the spring means is extended or contracted so as to compensate for the varying force exerted by the spring at different positions.

5. A yieldable support comprising spring means adapted to be extended or contracted and forming a link in the connection of the supported load to the fixed point of support, and a pivoted member between the spring means and the load and connected therebetween so that each tends to move said member about its pivot and so that the relative leverage of the spring and of the load upon said pivoted member will be varied so as to compensate for the difference in the force exerted by the spring in different positions.

6. A yieldable support comprising spring means adapted to be extended or contracted and forming a link in the connection of the supported load to the fixed point of support, a lever pivoted on the fixed support, a load carrying member supported upon a part of said lever near the perpendicular from the pivot to the direction of pull of the load, means for holding the bearing point of said load carrying member on said lever substantially in the same straight line parallel to the direction of pull of the load, said spring means being connected to a part of the lever which is adapted by its movement to alter the leverage of the spring means relatively to the leverage of the load carrying member about said pivot so as to substantially compensate for changes in tension of the spring.

7. A yieldable support as defined in claim 2 which includes means for supplementing the action of the spring so as to compensate for imperfect uniformity in the force which it exerts on the load carrying member through the lever.

8. A yieldable support as defined in claim 2 which includes a supplementary spring and a cam moved by the lever and shaped so as to condition the action of the spring upon said lever to compensate for residual variations in the load carrying force exerted by the part of the apparatus defined in claim 2.

Signed at New York, New York, this 26th day of August, 1930.

JOSEPH KAYE WOOD.

DISCLAIMER 1,816,164.—*Joseph Kaye Wood*, Mount Vernon, N. Y. SUPPORT. Patent dated July 28, 1931. Disclaimer filed May 6, 1935, by the assignee, *General Spring Corporation*.

Hereby enters this disclaimer to that part of the specification printed on page 1, lines 82 and 83, which is in the following words, to wit: "Figure 5 is a diagrammatic view illustrating an additional compensating device."; and page 2, lines 47 to 71, of said patent which is in the following words, to wit: "as for example by means of a device as shown in Figure 5 in which the springs 21 and 22 connected to the lever 19 at one end and to the cross bar 13 at the other, act upon the accurately designed cam 23 connected to the lever 19. In the embodiment illustrated in Figure 5 the cam 23 is made with a central circumferential groove and the springs 21 made of music wire or other wear-resisting spring wire, have straight portions connected with the spiral portions so that the straight portions ride in the groove of the cam 23. The resistance of the springs 21, 22 to separation by the cam 23, plus the pull of the springs on the lever, serves to compensate for the inaccuracies of the device without such compensator The elliptical form of cam shown in Figure 5 is sufficiently accurate for practical purposes. The exact contour of the cam, however, if mathematically accurate, would vary slightly from the elliptical and will vary slightly according to the general design of the main features of the support.", and to claim 8 of said specification which is in the following words, to wit: "A yieldable support as defined in claim 2 which includes a supplementary spring and a cam moved by the lever and shaped so as to condition the action of the spring upon said lever to compensate for residual variations in the load carrying force exerted by the part of the apparatus defined in claim 2."; and to that part of the drawings designated as Figure 5.

[*Official Gazette May 28, 1935.*]